May 7, 1940.　　J. C. MACFARLANE ET AL　　2,199,441
ELECTRIC ROTARY CONVERTING SYSTEM
Filed July 9, 1937　　10 Sheets-Sheet 1

May 7, 1940.    J. C. MACFARLANE ET AL    2,199,441
ELECTRIC ROTARY CONVERTING SYSTEM
Filed July 9, 1937    10 Sheets-Sheet 10

Fig. 11.

Patented May 7, 1940

2,199,441

UNITED STATES PATENT OFFICE 2,199,441

ELECTRIC ROTARY CONVERTING SYSTEM

James Colquhoun MacFarlane and William Allan MacFarlane, Cathcart, Glasgow, Scotland Application July 9, 1937, Serial No. 152,826
In Great Britain July 17, 1936

24 Claims. (Cl. 172—239)

This invention relates to electric rotary converters for converting from a constant voltage (which may be adjustable) variable direct current supply to a variable voltage-variable direct current supply or vice versa, and it also relates to an improved converting system in which a motor driving a winch, windlass, capstan, crane, or any other load-handling apparatus of a similar kind, is supplied through a rotary converter as aforesaid.

The invention has for its primary object the provision of a system in which the torque-speed characteristic of the motor supplied by the converter is such that throughout a great part of its range, the output is of substantially constant power, so that a winch, for example, designed to lift 3 tons at say 100 feet per minute will not overload the motor or supply circuit when hoisting a lighter load at a higher speed. Our system will also regenerate on the load-lowering or reversing side, and is such that the load can be lowered under power at a speed not greatly in excess of "light hook" (that is, when carrying no load) hoisting speed. We also, by connecting up and controlling the rotary converter and motor in the manner to be described later, derive great benefit from the fact that wear and tear can be almost entirely removed from the brake linings of the electric brake, and the system can be made practically fool-proof in operation, while at the same time the whole plant can be made relatively small and inexpensively. Although the attainment of the abovedescribed advantages constitute the primary object of our invention, we do not limit ourselves to this, but may vary the torque-speed characteristic in any way desired to suit the load, which need not be as abovedescribed, but may be any type of load, in which the motor driving it may be stalled without danger either to the motor or converter, and we may vary the converter and/or the motor and regulating motor excitation windings in any way necessary to obtain the torque-speed curve required.

The basis of this invention is the rotary converter described in the specification of our British Patent No. 308,041 but modified in the manner to be described below.

In specification No. 308,041 the converter described gave a constant current-variable voltage output when supplied from a constant voltage circuit, and had no windings on its field, except the so called "abutment" windings, the function of which was to keep the speed of the converter constant when running under its own power and not using a pony motor.

The field of this converter was a $n$-pole construction when referred to each individual circuit, and it had therefore a total of $2n$ poles, the poles of each circuit being set alternately between the poles of the other circuit. The armature was of short span when referred to the pole span proper of each circuit, but was of normal span when referred to a $2n$ polar field. That is to say the "short" span was of approximately 90 electrical degrees when referred to the pole span proper of each circuit.

The whole of the excitation for these poles (which as stated above had no real excitation windings upon them) was provided by the armature, the excitation of the $n$ poles responsible for generating the voltage at the secondary brushes being provided by the primary current circulating in the armature, and the excitation of the $n$ poles responsible for generating the back E. M. F. (electromotive force) at the primary brushes being provided by the secondary current circulating in the armature. The secondary output was therefore (except for losses) an exact reflex of the primary input, in respect that a constant voltage-variable current input was balanced by a constant current-variable voltage output. There was also described with reference to Fig. 6 of that specification a system consisting of the converter just described, working in conjunction with a motor, and suitable for some of the purposes above described. That system, however, suffered from the serious limitation that it could not regenerate on the load-lowering or reversing side, and therefore the speed of the motor was not limited at the load-lowering or reversing side.

It is an aim of this present invention to remedy this defect, at the same time producing a suitable torque-speed characteristic at the main motor shaft, and making better use of the effective material in both converter and motor.

An object of the invention is a converter for converting a constant voltage-variable direct current supply to a variable voltage-variable direct current supply or vice versa, comprising, in combination, a field structure having $2n$ poles of which $n$ poles belong to the primary (or motoring) circuit and $n$ poles to the secondary (or generating) circuit, the $n$ primary poles being set alternately with the $n$ secondary poles, an armature having a winding whose span is that usually used with a $2n$ polar field, that is of 180 electrical degrees if referred to the $2n$ pole field but of 90 electrical degrees if referred to the $n$ pole field proper to each circuit, the main excitation on the primary poles being provided by the armature reaction m. m. f. due to the current in the secondary circuit and the main excitation of the secondary poles being provided by the armature reaction m. m. f. due to the current in the primary circuit, $2n$ interpoles each interpole carrying two windings one winding in the primary circuit and one winding in the secondary circuit, abutment windings on the secondary poles comprising a winding connected across the primary supply and assisting the armature m. m. f. due to the primary current and a series opposition winding connected in series with the secondary output current and opposing the armature m. m. f. due to the primary current; and a compounding magnetising winding on the primary main poles of the converter assisting the said main excitation thereof by the armature m. m. f. due to the secondary current.

The said compounding winding may be connected in shunt across a constant voltage supply, for example, the primary supply or may be connected across the secondary voltage, or may be connected in series with the primary circuit or the secondary output circuit.

A further object of the invention is the combination with a converter as set forth in the last two foregoing paragraphs, of a main motor with its armature connected in the secondary circuit of the converter, the field winding of the main motor being supplied from a substantially constant voltage supply, for example, from the primary circuit, and a regulating motor driven at a speed proportional to that of the main motor, the armature of the regulating motor being connected in series with the field of the main motor and opposing the excitation derived from said constant voltage supply.

In accordance with a further object, the field of the regulating motor may be excited from a, or the said, constant voltage supply or the said field may be excited by a winding in series with the secondary current of the converter.

In accordance with further objects, windings additional to these described above may be provided either on the converter motoring poles or the regulating motor field, and any such additional windings may be either in opposition to, or assisting, the main field thereof. In the converter, however, any such additional winding if opposing the main field due to armature reaction would never be great enough to neutralise or cancel same.

The preferred excitation of this regulating motor is, however, either a constant excitation derived from the constant voltage supply or an excitation derived from the secondary current of the converter, constant in direction but variable in strength.

In order that our invention may be properly understood and carried into effect we append hereto, by way of example, explanatory sheets of drawings wherein—

Fig. 10 shows the volt-ampere characteristic of the converter from which the torque-speed curves of Figs. 8 and 9 are calculated.

Figures 11—A and 11—B are detail views of some of the switches shown in Figure 11.

We have not shown in any of these drawings what the effect of other combinations of excitations will be (such for instance as in Fig. 7 where the regulating motor field might also be supplied from the secondary current as in Fig. 6) but these can readily be inferred from the more detailed description we are about to give.

In order to shorten the description as much as possible we will in what follows refer to the primary supply voltage as $E$, the secondary output voltage from the converter (which is also the voltage across the brushes of the main motor neglecting voltage drop in any series coils) as $e$, the primary converter motoring current as $I_M$, and the secondary converter output current as $I_G$.

Throughout the drawings, the same reference characters refer to similar parts.

Figure 1:
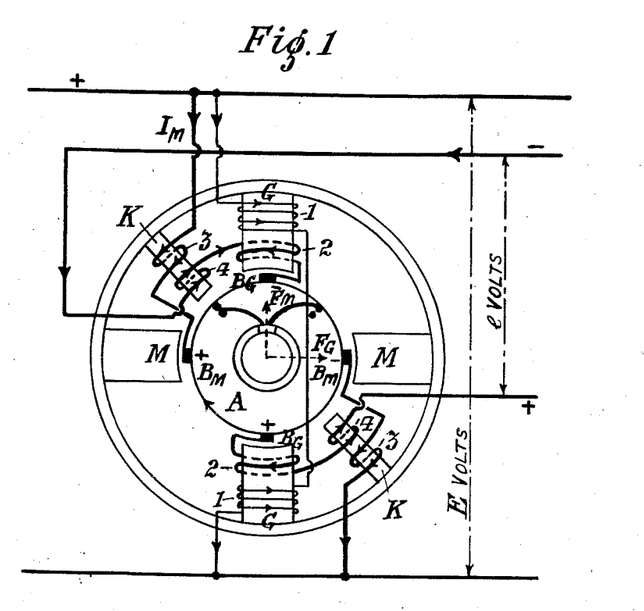
Fig. 1 shows the converter of British Patent No. 308,041 as described with reference to Fig. 3 of that specification.

Fig. 1 shows a converter A as shown in the specification of British Patent No. 308,041, and in this figure are clearly seen the primary or motoring poles M, unwound, the secondary or generating poles G carrying the "abutment" coils consisting of the shunt abutment coil 1 connected across E and assisting the armature magnetisation $F_M$ and the abutment series opposition coil 2 carrying the secondary current $I_G$ and opposing $F_M$. $Bm$ and $Ba$ are the primary and secondary brushes respectively. $F_M$ is the armature magnetisation on the secondary poles set up by the primary current $I_M$, and $F_G$ is the armature magnetisation on the primary poles set up by the secondary current $I_G$. The two interpoles K each have two windings, one carrying $I_M$ and the other $I_G$. The machine is of 2-pole construction as regards each circuit, and therefore has 4 actual poles and the armature coil span is that suited to a 4-pole machine. The output from this machine was definitely constant current at variable voltage, that is $I_G$ was of invariable value while $e$ varied with the load. On the other hand E being of fixed value and $I_M$ variable the input and output were an exact reflex of one another. The entire magnetisation of the fields of the machine was from the armature, $F_M$ caused by $I_M$, magnetising the primary poles M. The abutment coils 1 and 2 balanced one another out at all loads, and only differed from one another in m. m. f. (magneto-motive-force) if the speed departed from the value fixed by their proportionate magnetising effects.

Figure 2:
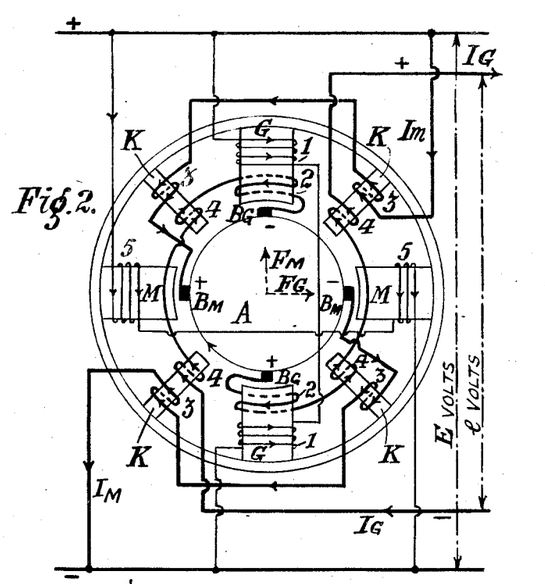
Fig. 2 shows the converter of our present invention with the compounding magnetising windings on the motoring poles excited from the constant voltage supply.

Fig. 2 shows the machine already described under Fig. 1 but modified according to one form of our invention.

The poles M have a compounding shunt winding 5 connected across the voltage E. There are shown also four interpoles K each with coils 3 and 4 carrying the $I_M$ and $I_G$ currents respectively. In this case the abutment coils do not cancel out the m.m.f. of each other except on short circuit, when the $e$ voltage is zero. The m. m. f. of windings 5, assist the armature m. m. f., $F_G$.

Figure 3:
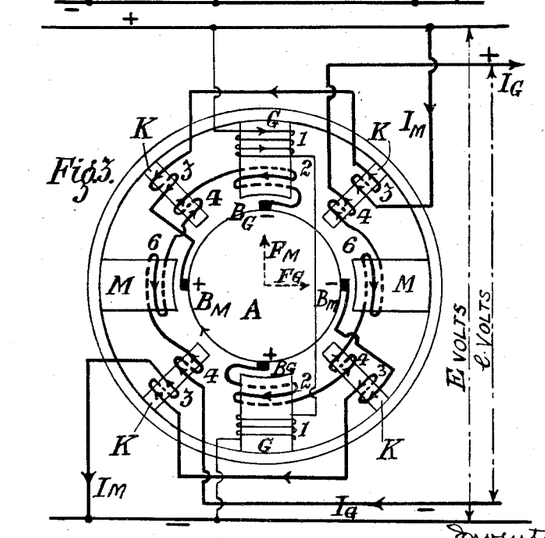
Fig. 3 shows the converter of our invention with the compounding windings on the motoring poles excited from the secondary circuit of the converter.

Fig. 3 shows a machine as described with reference to Fig 2, but with the shunt compounding windings 5 replaced by series compounding windings 6 carrying the $I_G$ current and assisting the armature m. m. f., $F_G$.

We have not shown the converter with compounding windings on the motoring poles connected across $e$ or with such windings in series with $I_M$, as these are not of so much interest for our present purpose, but such windings may be used either alone or in conjunction with the windings shown in Figs. 2 and 3 if desired, and in one modification a winding carrying the $I_M$ current opposes the shunt winding 5 of Fig. 2.

Figure 4:
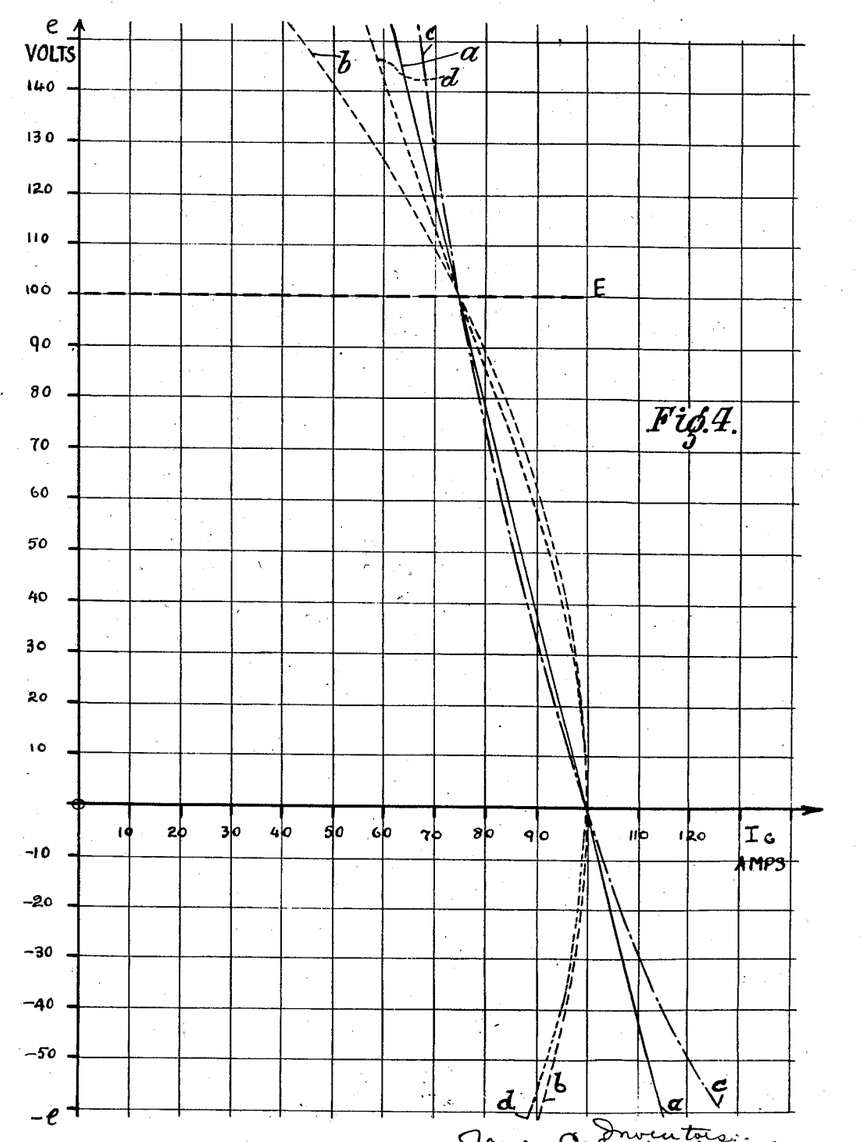
Fig. 4 shows characteristic volt-ampere curves obtained from the converter with different methods of exciting or compounding the motoring poles.

Fig. 4 shows the types of output volt-ampere characteristics obtainable from the converter with the motoring poles carrying compounding windings excited in the manner already described, and in this figure—

(a) Curve $a$ (straight line) is the output characteristic with compounding windings on the motoring poles connected across E as in Fig. 2. The formula governing this characteristic is:

$$I_G = \frac{K_2 E - K_3 e}{n_2}$$

where $K_2$, $K_3$ and $n_2$ are constants.

(b) Curve $b$ is the output characteristic with compounding windings on the motoring poles connected across $e$. The formula for this curve is:

$$I_G = \frac{K_2 E^2 - K_4 e^2}{n_2 E}$$

where $K_2$, $K_4$ and $n_2$ are constants.

(c) Curve $c$ is the output characteristic with compounding windings on the motoring poles connected in series with $I_G$ as in Fig. 3, the formula being:

$$I_G = \frac{K_2 E^2}{n_2 E + n_3 e}$$

where $K_2$, $n_2$ and $n_3$ are constants.

(d) Curve $d$ is the output characteristic with compounding windings on the motoring poles connected in series with $I_M$ the formula being:

$$I_G = \frac{K_2 E^3}{n_2 E^2 + n_1 e^2}$$

where $K_2$, $n_2$ and $n_1$ are constants.

Curves $a$ and $c$ are preferred ouput characteristics, $b$ and $d$ by themselves not being suitable for our present purpose, but we may nevertheless use these excitations either alone or in combination with $a$ and $c$ for particular purposes. Particularly the excitation giving curve $a$ may be used with the excitation giving curves $d$ or $c$ reversed to give a concave shaped characteristic similar to $c$.

It is to be understood, of course, that the curves shown and the formula from which they were derived are based entirely on theoretical conditions and do not allow, for instance, for the effect of magnetic saturation in various parts of the magnetic circuit, but a designer skilled in the art can easily allow for practical conditions.

Figure 5:
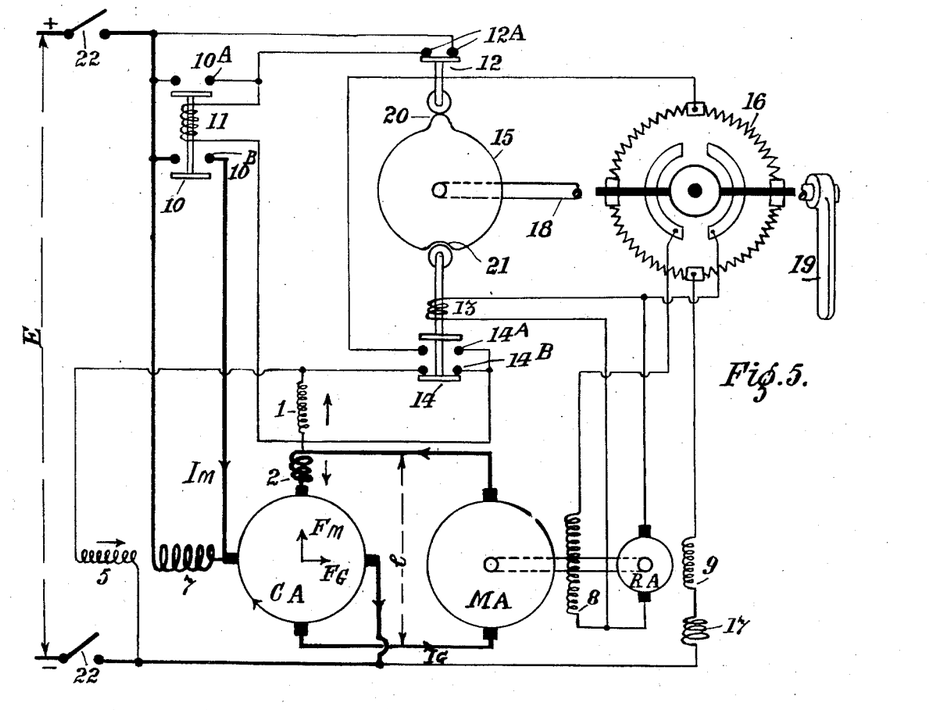
Fig. 5 shows a complete system of converter, with main motor and regulating motor, the converter motor poles having compounding windings excited by a voltage derived from the constant voltage supply, and the regulating motor excitation being also derived from the constant voltage supply.

Fig. 5 shows a complete system with converter CA, main motor MA and regulating motor RA. Starting coils 7 are mounted on the motoring poles, in series with the $I_M$ current, in addition to the compounding windings 5 already described with reference to Fig. 2.

These coils 7 may have a resistance in series with them but for our immediate purpose are preferably of high resistance themselves and are in circuit for starting purposes only. On the shaft 18 operated by the handle 19 is the potentiometer regulator 16 and a cam 15 having a projection 20 and a recess 21.

When the potentiometer is in the neutral or "off" position as shown, projection 20 lifts the mechanical switch 12 so as to close its contacts 12A, thus completing the circuit (after the switch 22 is closed) through contactor coil 11, shunt abutment coils 1, and motoring shunt compounding windings 5. At the same time recess 21 allows the contactor 14 to close the contacts 14B thereby simultaneously short circuiting the abutment coils 1. Under this condition the converter armature CA will receive current through the starting coil 7 and will start up immediately switch 22 is closed. As soon as the circuit through coil 11 and winding 5 (coils 1 being shorted out) has risen to nearly full value, coil 11 closes contactor 10, thereby shorting coil 7 through contacts 10B and the contactor maintains itself on the "on" position through contacts 10A. As coils 1 are short-circuited out, coils 2 (opposition abutment series) prevent the converter from generating any secondary voltage and the current $I_G$ is therefore practically zero, the converter running as an ordinary motor on its field 5 (strengthened by the cutting out of coils 1) and preventing any damage to the commutator of MA, due to current passing at standstill. Since there is no armature current in MA and since the field 8 is as yet unexcited, no torque can be developed by the main motor and the load (if any) is held by the brake. On moving the handle 19 off the neutral position, the following occurs:

(a) Contacts 12A are opened, but contactor coil 11 maintains the short circuit over coils 7 owing to the closing of contacts 10A.

(b) Contacts 14B are opened removing short circuit from coils 1 and allowing the converter to generate voltage, at the same time reducing the current in windings 5 to the proper amount to give the correct volt-ampere characteristic.

(c) Simultaneously contacts 14A close giving a supply of current from the line to the potentiometer regulator 16, to the regulating motor field 9, and to the brake coil 17 which takes off the brake. The increased current through 11 ensures that the contactor 10 will remain closed. The field 8 of MA receives a voltage tapped off the potentiometer regulator in proportion to the displacement of the handle 19 off the neutral, positive or negative according to whether the handle is in the forward or reverse position.

If the torque of MA is sufficient to raise the load, MA speeds up but immediately thereon armature RA begins to generate voltage in opposition to the derived voltage supplying 8. The speed therefore of MA is limited by the consequent reduction of torque. Should the handle 19 be returned quickly to neutral while the motor MA is running at high speed, the coil 13, connected across the regulating motor brushes, prevents the contactor 14 from falling into the recess 21 until the speed has fallen to a low value, thus maintaining current on 16 and 17 and so preventing the application of the brake until regeneration has absorbed most of the power. Regeneration, on returning the handle 19 to neutral while MA is still running, is due to the fact that field 8 is deprived of voltage, while RA continues to run under full field giving a reverse m.m.f. to coil 8. The brake therefore is preserved from wear and tear due to having to stop the machine and load, by itself.

This is a most important feature in that the loss through having frequently to replace worn out brake linings is eliminated.

Should the whole plant be shut down at the main switch 22 before returning the handle 19 to neutral, the brake will then immediately come on and sustain the load, if any, but any attempt to start up again by closing 22 will only cause the converter to start up and run on its starting coil 7, which is of a value only sufficient to run the converter at a moderate speed against its own natural losses and windage. As contacts 12A and 10A are open no voltage is conveyed to the windings 5 and 9, and coils 1, 8 or 17 and the motor armature MA can therefore exert no torque. Return of the handle 19 to neutral puts everything in order, however, for a restart and the same sequence of events takes place automatically.

Figure 6:
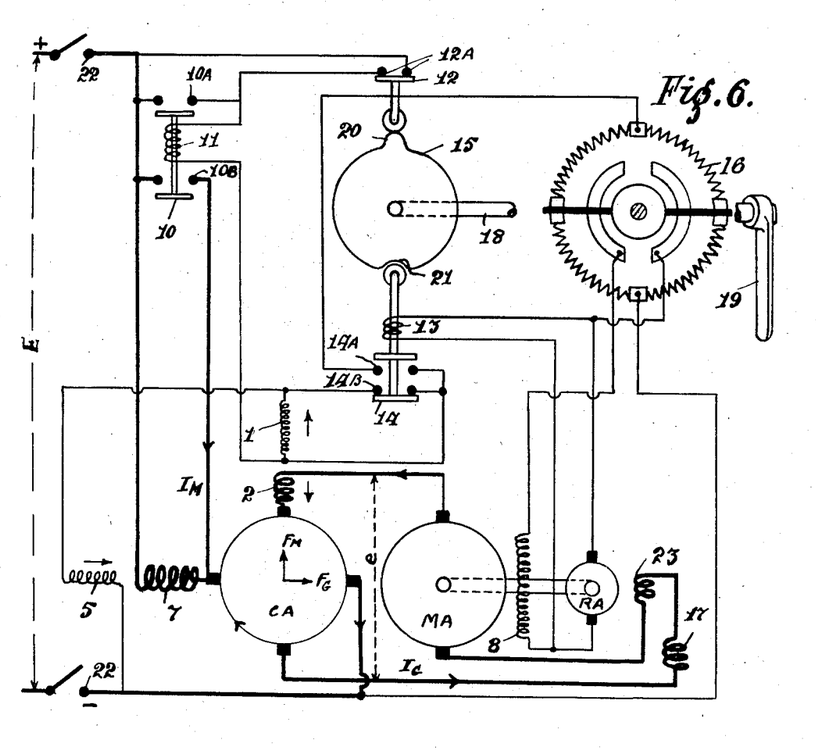
Fig. 6 shows a complete system as in Fig. 5 but with the regulating motor field supplied by the secondary current instead of from the primary voltage.

In Fig. 6, a similar system is shown but in this case the excitation of the regulating motor is from the secondary current of the converter, windings 23 being in series with $I_G$. In this case the brake coil 17 is also shown in series with $I_G$. This method of connection, using the $I_G$ current to excite the regulating motor field has certain advantages which will be pointed out in connection with the torque-speed curve for this arrangement shown in Fig. 9.

Figure 7:
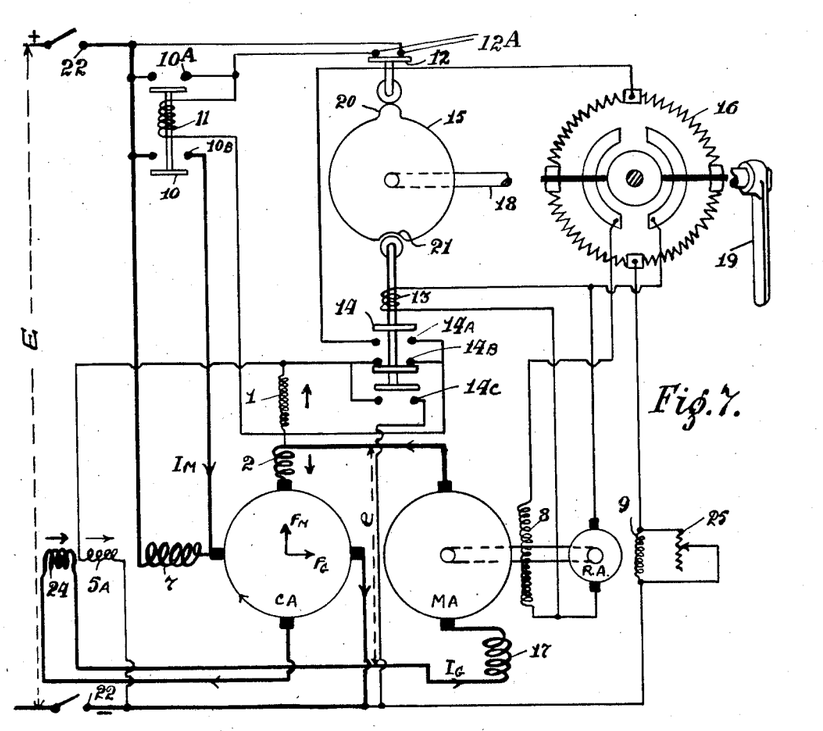
Fig. 7 shows a complete system as in Fig. 5 but in this case the excitation of the compounding windings on the motoring poles of the converter is from the secondary circuit.

Fig. 7: In this arrangement the $I_G$ current is utilised to supply the field 24 on the motoring poles of the converter instead of the aforesaid compounding windings 5 connected across the primary voltage E.

In this case, however, since the shunt abutment coils 1 are short-circuited out when the handle 19 is in the neutral position, and since the $I_G$ current is negligible at neutral, under these conditions the converter would have no field on which to run after the contactor 10 has short-circuited the starting coils 7. It is therefore necessary to retain the coils 5, not for the purpose of fixing the characteristic of the converter, but to provide a field until the current $I_G$ is established. As their function is not the same as that of windings 5 in Figs. 5 and 6, we have indicated these in Fig. 7 as coils 5A. The mechanically operated switch 14 is provided with an additional pair of contacts 14C adapted to short circuit out coils 5A when the shunt abutment short circuit is removed. In order to allow time for the current $I_G$ to establish itself we may use electrical interlocks in known manner to delay the closing of contacts 14C (even after contacts 14B are opened) for a sufficient length of time; or known electrical devices can be used to connect coils 1 to the negative line and after a suitable delay to open-circuit coils 5A. The methods of doing this are apparent to anyone skilled in the art.

In this figure is also shown a method of regulating the speed and torque of the main motor MA by varying the excitation of the regulating motor as shown at 25. This or any other well known method of changing the excitation of the regulating motor field can be used, either alone, or in conjunction with the main regulator 16, but we do not claim this method of regulation as novel, and mention it merely to show that if necessary it can be incorporated in our system as described.

Figure 11:
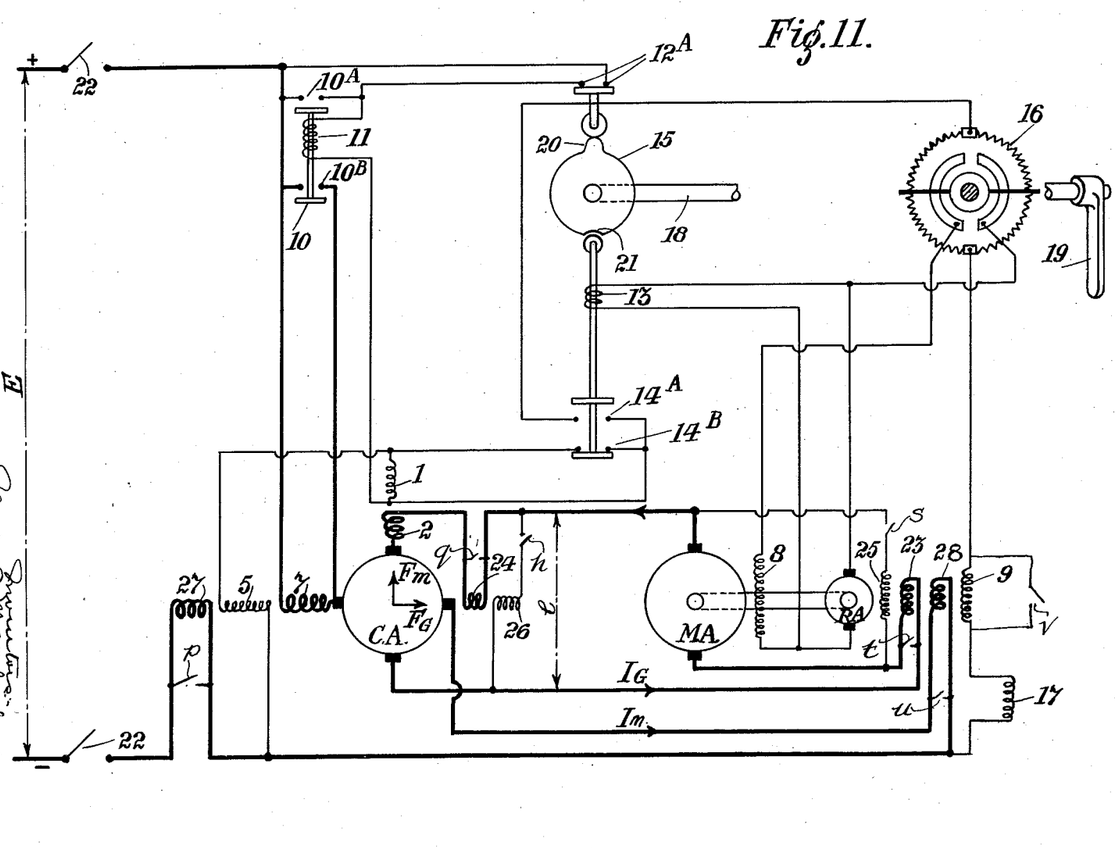
Figure 11 shows a complete system as in Figures 5 and 6, but in which the excitations of the converter and regulating motor are effected by a combination of various windings.

Figure 11 shows an arrangement similar to Figures 5 and 6 but making use of the various sources of supply, in suitable proportions of course, for excitation of the converter and regulating motor.

On the converter motoring axis there are mounted, in addition to the starting coils 7, and the compounding coils 5 (of Figures 5 and 6), coils 24 carrying the generated current $I_G$, coils 26 carrying a current derived from the secondary voltage $e$ of the generator, and coils 27 carrying the primary motoring current $I_M$. On the regulating motor field are mounted coils 9 carrying current derived from the constant voltage supply E (as shown in Figure 5), coils 23 carrying the secondary generated current $I_G$ (as in Figure 6), coils 25 carrying a current derived from the secondary generated voltage $e$, and coils 24 carrying the primary motoring current of the converter $I_M$.

These coils on the motoring axis of the converter, and on the field of the regulating motor are combined in such proportions as to give the particular effect desired (see Figure 4), and for the purpose of getting the exact speed-torque characteristic desired in any given case (adhering of course generally to the type of curves shown in Figures 8 and 9) certain of the coils may be arranged to oppose the remainder, on either or both the motoring axis of the converter and the regulating motor field.

The brake coil 17 is shown (as in Figure 5) in the circuit connected across the constant voltage E and in series with coils 11 and 9 and potentiometer regulator 16. Otherwise the circuit is similar to those shown in Figures 5 and 6.

Switches $p, q, r, s, t, u, v$, are shown for switching in or out the various windings so as to obtain the desired combination of windings.

Coils 1, 2, 5 and 7 on the converter and also coil 8 on the motor are essential parts of the scheme and must not be short-circuited out, except as indicated by the various contactors. The other coils can be short-circuited or open circuited by the switches as shown to obtain the desired combination of windings. All series coils are short-circuited, coil 27 by switch $p$, coil 24 by switch $q$, and coils 23, 28 (on the regulating motor) by switches $t$ and $u$. Shunt circuits 25 and 26 are to be open circuited, while coil 9 may be by-passed by switch $v$.

In the case of shunt coils, the coils may, if required, be protected against inductive breakdown by suitably placed discharge resistances.

Figures 10, 11A, 11B:
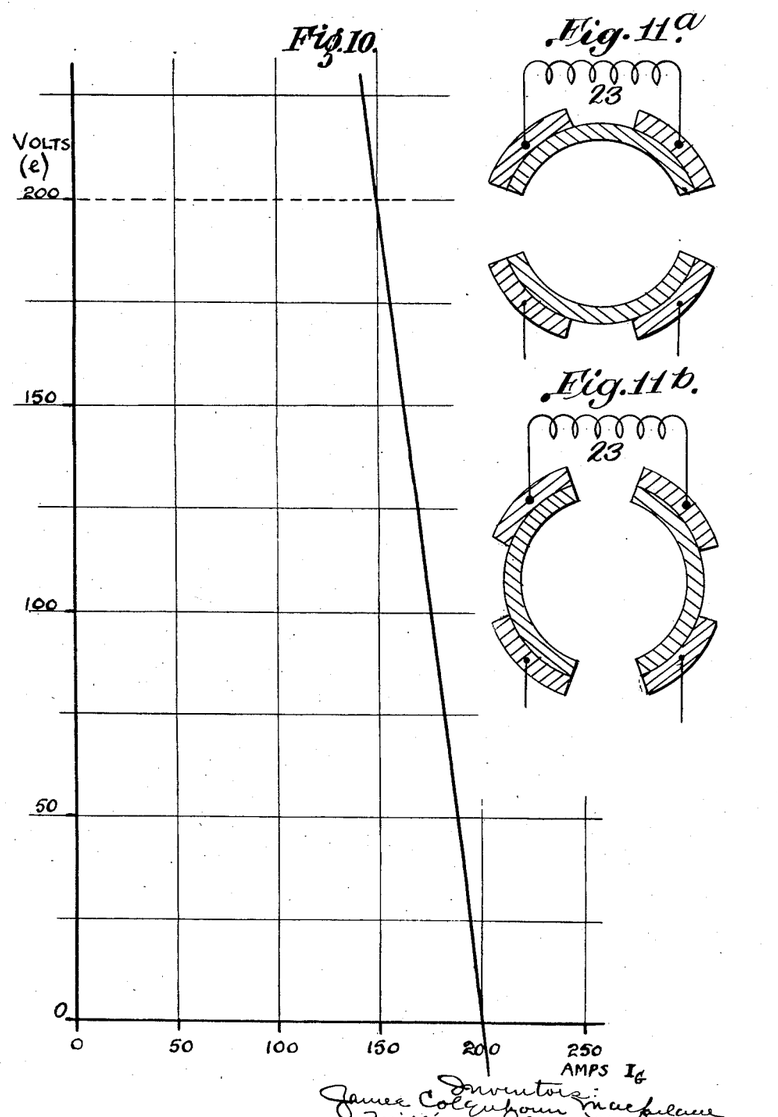

For the coils 23, 28 on the regulating motor and for the coils 24, 27 on the converter, the type of short circuiting switch should be as shown in Figures 11—A and 11—B since this can be arranged to short-circuit the coil and at the same time isolate it from the line without breaking the main circuit. Figure 11—A shows coil 23 (by way of example) disconnected and the line short-circuited, and Figure 11—B shows the coil in circuit. Switches as shown in Figures 11—A and 11—B are connected at $p$, $q$, $t$, $u$, the other switches $r$, $s$, $v$, being of the usual opening type.

Figure 8:
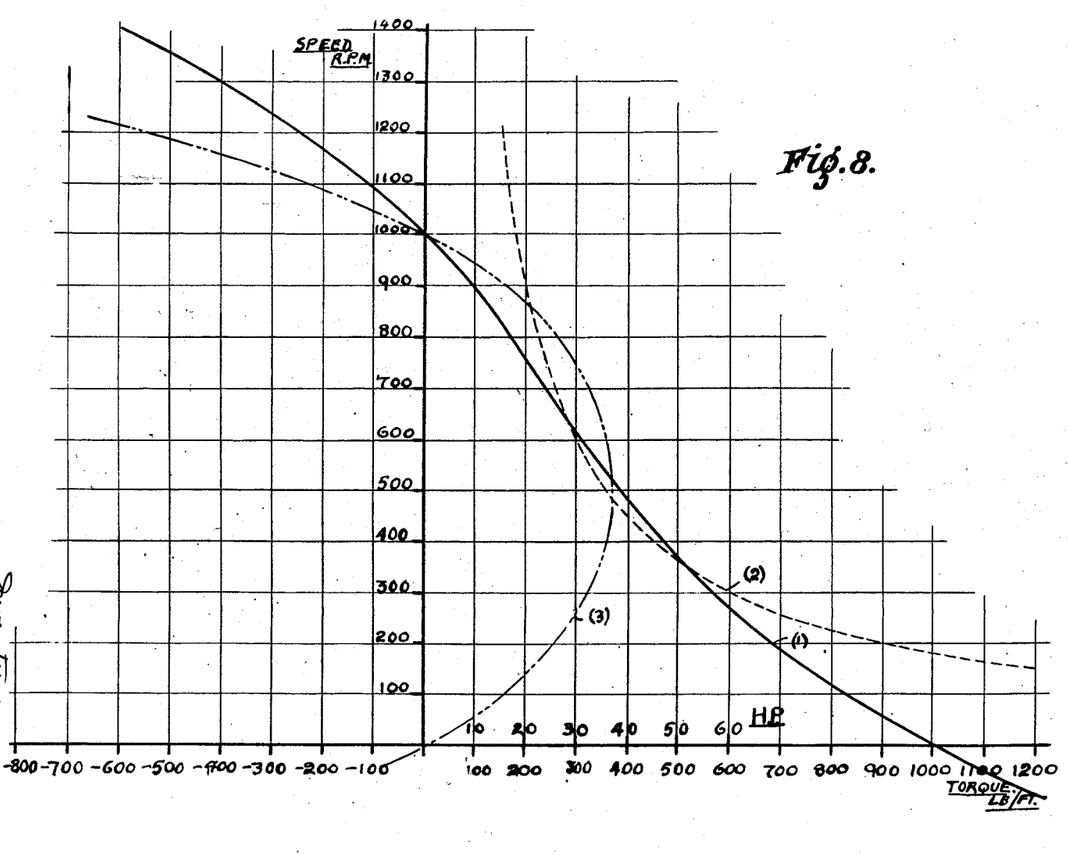
Fig. 8 shows the type of main motor torque-speed curve obtainable with a circuit having the connections of Fig. 5.

Fig. 8 shows the torque-speed characteristics of a system as shown in Fig. 5, and in the drawings—

1 is a curve of speed against torque at the shaft of the main motor MA, 2 is a torque-speed curve representing constant power, and showing the close approach of this curve to that of curve 1 over the most important working range of the motor, 3 is a curve of actual horse power against speed corresponding to curve 1.

It will be seen that up to about 300 R. P. M. very heavy loads are lifted at low but increasing speeds as the load is lightened, with but small horse power inputs; after which for normal loads, the variation of power does not exceed 7 per cent above or below the mean power, as shown by curve 3 between 300 and 700 R. P. M. After that the power falls off again with increasing speed up to zero power at "light hook" speed.

Most other systems provide either a torque-speed characteristic bulging outwards, or at the best a straight line characteristic, and these have the disadvantage that if the motor is designed to give the necessary stalling torque, the horse power demanded at the working part of the curve is excessive, or if designed not to exceed the maximum power available or allowable, the stalling torque is seriously deficient.

It will also be seen that up to about 60 per cent of the stalling torque can be obtained in the lowering (negative torque) side without the speed rising higher than 40 per cent above "light hook" speed. This curve of course takes no account of losses, and if this is allowed for speeds even lower on the lowering side can be obtained in a practical design.

The theoretical formula from which the curve 1 is determined is:

$$T = T_0\left\{\left(1-\frac{S}{S_1}\right) - KS\left(1-\frac{S}{S_1}\right)^2\right\}$$

where
 $T_0$ = Stalling torque.
 $S$ = Speed for torque $T$.
 $S_1$ = "Light hook" speed.
 $K$ = Constant determined by the design of the machine.

This curve is derived from an $I_G$ current characteristic as shown in Fig. 10, which again is obtained from a converter using the shunt compounding winding over E on the motoring poles of the converter, as shown in Fig. 5.

Figure 9:
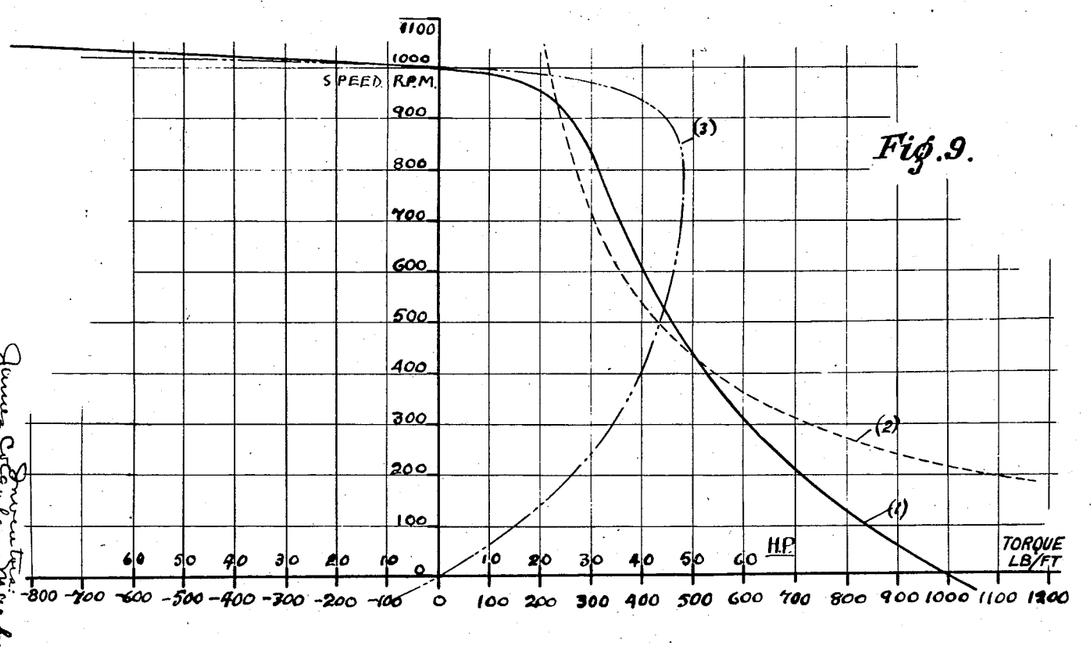
Fig. 9 shows the type of main motor torque-speed curve obtainable with a circuit having the connections of Fig. 6.

Fig. 9 shows a series of torque-speed, and power, curves, with similar references as in Fig. 8, obtained from the arrangement of compounding windings shown in Fig. 6, i. e., with the converter motor poles provided with windings 5 across E and the regulating motor field excited from the $I_G$ current. In this case the conditions are even better for some purposes than Fig. 8, in respect that while the variation of power is even less than in Fig. 8 over a greater range of speed, the greatest power demand takes place at the highest speeds, so that light loads are lifted and handled quickly, while the full torque is still available for lifting heavy loads at low speeds.

Also since greater powers are obtainable at the higher speeds, this arrangement gives a rather cheaper machine from the point of view of first cost.

The formula controlling this torque-speed curve is:

$$T = T_0\left\{\left(\frac{1-C_1S}{1-C_2S^2}\right) - C_3S\left(\frac{1-C_1S}{1-C_2S^2}\right)^2\right\}$$

where as before
 $T_0$ = Stalling torque, $S$ is the speed at torque $T$ and $C_1$, $C_2$, $C_3$ are constants of the machine.

The curve as shown on Fig. 9 is obtained with an $I_G$ current characteristic as shown on Fig. 10. It is to be noted that on the lowering side the curve is very flat, with the result that, in lowering, loads can be (theoretically) handled up to a load requiring a torque equal to the stalling torque of the machine without exceeding the "light hook" speed by more than 6 per cent. Even better torque-speed curves for certain purposes can be obtained by using the arrangement of Fig. 7 for the converter and Fig. 6 for the regulating motor, but it will be clear that the combinations already described give very important advantages from a practical point of view, in respect to give only one instance, that it is now possible to supply winch motor drives to small ships which will allow of the maximum use being made of the usually limited power available to handle medium and light loads at high speeds, while still retaining a sufficiently high stalling torque to enable heavy loads to be lifted and handled at low speeds and without the use of gear changes.

We have found that the slope of the volt-ampere characteristic of the converter influences the shape of the torque-speed curve of the motor, in respect that a greater slope gives a concave torque-speed curve which approaches still more nearly to the constant power characteristic. There are practical limitations to increasing the slope of the straight line characteristic $a$ in Fig. 4, but improvement in this respect can be obtained by using the $I_G$ current for excitation on the motoring poles (connected as in Fig. 7) to give curve $c$, or again by modifying the straight line characteristic $a$ by reverse compounding with the $I_M$ current or with a field derived from the secondary voltage $e$. These curves are shown in Fig. 4 as $d$ and $b$ respectively, but these curves show the effect of the compounding windings operating by themselves only on the motoring poles and in the positive direction. Used along with the connections of Fig. 2 or Fig. 3 they would be used reversed.

It is to be understood that under the present invention the main excitation of the main poles of the converter is provided by the armature reaction m. m. f., that is to say, the main excitation of the primary poles is provided by the armature reaction due to the secondary current, and the main excitation of the secondary poles is provided by the armature reaction due to the primary current. Hence in order to ensure this main excitation, no compensating windings for the purpose of neutralising or cancelling the armature reaction m. m. f. are to be fitted. This is an essential distinction from the subject matter of prior British patent specification No. 405,759, and the converter output volt-ampere characteristic is quite different under the present invention from that obtainable from the converter as described in the said specification. This main excitation may be compounded on the motoring poles by shunt compounding windings connected across E or e, or by series windings carrying $I_G$ or $I_M$, either singly or in combination. For example, the compounding may comprise a shunt winding connected across the primary voltage and assisting the armature m. m. f. and a shunt winding connected across the secondary voltage and opposing the armature m.m.f.; or, the compounding may comprise a winding connected in series with the secondary circuit and assisting the armature m. m. f. but opposed by a winding connected in series with the primary circuit.

Excitation of the regulating motor poles may be effected by windings connected across E or e, or by series coils carrying $I_G$ or $I_M$, either singly or in combination. For example, they may be excited from a constant voltage supply such as that of the primary circuit, and have compounded therewith additional field windings carrying a current derived from the secondary voltage of the converter, or from the primary current of the converter, or both in combination.

We have not considered it necessary to show more than a few of the combinations of the magnetising windings described for the converter and regulating motor, as it will be apparent to one skilled in the art, that the effect of any such combinations can be inferred from the formulae and curves given herein for specified cases.

It will be found in general, when using any form of excitation on the motoring poles, that the m. m. f.'s of the two abutment coils on the generating poles will not be equal and opposite to one another, except at short circuit, whereas in British specification No. 308,041 these coils balanced one another out at all loads. Therefore the values of the m. m. f.'s of the shunt abutment and series opposition abutment coils of the present invention, will in general be quite different from those found suitable for the invention in British specification No. 308,041.

It is to be understood that we do not limit ourselves to the exact mechanical or electrical devices or arrangement of parts shown on the figures or described in this specification, but may vary these in any known manner (within the scope of the following claims), for instance, we may regulate on the regulating motor field as well as on the main potentiometer regulator, or we may connect the brake in any circuit in which the current is cut off or disappears when the controller is at the neutral position.

We claim:

1. The combination of a converter for converting a constant voltage-variable direct current supply to a variable voltage-variable direct current supply or vice versa with an electric motor unit, said converter comprising an armature, a field structure having $2n$ poles of which $n$ poles belong to the motoring circuit of the armature and $n$ poles to the generating circuit of the armature, the $n$ primary motoring poles being set alternately with the $n$ generating poles, the armature having a winding whose span is that usually used with a $2n$ polar field, that is of 180 electrical degrees if referred to the $2n$ pole field but of 90 electrical degrees if referred to the $n$ pole field proper to each circuit, the main excitation on the motoring poles being provided by the armature reaction m. m. f. due to the current in the generating circuit and the main excitation of the generating poles being provided by the armature reaction m. m. f. due to the current in the motoring circuit, $2n$ interpoles each interpole carrying two windings, one winding in the motoring circuit and one winding in the generating circuit, abutment windings on the generating poles comprising a winding connected across the constant voltage supply and assisting the armature m. m. f. due to the motoring current and a series opposition winding connected in series with the generated output current and opposing the armature m. m. f. due to the motoring current and a compounding magnetising winding on the motoring main poles of the converter assisting the said main excitation thereof by the armature m. m. f. due to the generated current, and said unit comprising a main motor having its armature connected to the generating circuit of the converter and its field winding supplied from a constant voltage supply, a regulating motor including a field winding and an armature, and means for driving same at a speed proportional to that of the main motor, the armature of said regulating motor being connected in series with the field winding of said main motor and opposing the same.

2. The combination of an electric rotary converter and electric motor unit as claimed in claim 1, in which the field winding of the regulating motor is connected to a constant voltage supply.

3. The combination of an electric rotary converter and electric motor unit as claimed in claim 1, in which the field winding of the regulating motor is connected in series with the generating circuit of the converter.

4. The combination of an electric rotary converter and electric motor unit as claimed in claim 1, in which the field winding of the regulating motor is connected to a constant voltage supply and the regulating motor has an additional compounding field winding connected in series with the generating circuit of the converter.

5. The combination of an electric rotary converter and electric motor unit as claimed in claim 1, in which the field winding of the regulating motor is connected to a constant voltage supply and the regulating motor has an additional compounding winding carrying a current derived from the generating circuit voltage of the converter.

6. The combination of an electric rotary converter and electric motor unit as claimed in claim 1, in which the field winding of the regulating motor is connected to a constant voltage supply and the regulating motor has an additional compounding winding in series with the motoring circuit of the converter.

7. The combination of an electric rotary converter and electric motor unit as claimed in claim 1, in which the field winding of the regulating motor is connected to a constant voltage supply and the regulating motor has an additional compounding winding carrying a current derived from the generating circuit voltage of the converter and a further additional compounding winding in series with the motoring circuit of the converter.

8. The combination of an electric rotary converter and electric motor unit as claimed in claim 1, in which the field winding of the regulating motor is connected in series with the generating circuit of the converter, and the regulating motor has an additional compounding field winding carrying a current derived from the voltage of the generating circuit of the converter.

9. The combination of an electric rotary converter and electric motor unit as claimed in claim 1, in which the field winding of the regulating motor is connected in series with the generating circuit of the converter and the regulating motor has an additional compounding field winding carrying a current derived from the motoring circuit of the converter.

10. The combination of an electric rotary converter and electric motor unit as claimed in claim 1, in which the field winding of the regulating motor is connected in series with the generating circuit of the converter and the regulating motor has an additional compounding field winding carrying current derived from the voltage of the generating circuit of the converter, and a further additional compounding winding carrying a current derived from the motoring circuit of the converter.

11. The combination of an electric rotary converter and an electric motor unit as claimed in claim 1, in which the said compounding magnetising winding is connected in shunt across a constant voltage supply, and in which the field winding of the regulating motor is connected in shunt across a constant voltage supply.

12. The combination of an electric rotary converter and an electric motor unit as claimed in claim 1, in which the said compounding magnetising winding is connected in shunt across a constant voltage supply, and in which the field winding of the regulating motor is connected in series with generating circuit of the converter.

13. The combination of an electric rotary converter and an electric motor unit as claimed in claim 1, in which the compounding magnetising winding is connected in series with the generating circuit of the converter, and in which the field winding of the regulating motor is connected across a constant voltage supply.

14. The combination of an electric rotary converter and an electric motor unit as claimed in claim 1, in which said compounding magnetising winding is connected in shunt across a constant voltage supply.

15. The combination of an electric rotary converter and an electric motor unit as claimed in claim 1, in which said compounding magnetising winding is connected in series with the generating circuit of the converter.

16. The combination of an electric rotary converter and an electric motor unit as claimed in claim 1, in which said compounding magnetising winding is connected in shunt across a constant voltage supply, and is opposed by a compounding magnetising winding on the motoring poles in series with the motoring circuit of the converter.

17. The combination of an electric rotary converter and an electric motor unit as claimed in claim 1, in which said compounding magnetising winding is connected in shunt across a constant voltage supply and is opposed by a compounding magnetising winding on the motoring poles connected in shunt across the generating circuit of the converter.

18. The combination of an electric rotary converter and an electric motor unit as claimed in claim 1 in which said compounding magnetising winding is connected in series with the generating circuit of the converter and is opposed by a compounding magnetising winding on the motoring poles connected in series with the motoring circuit of the converter.

19. The combination of an electric rotary converter and an electric motor unit as claimed in claim 1 in which said compounding magnetising winding is connected in series with the generating circuit of the converter and is opposed by a compounding magnetising winding on the motoring poles connected in shunt across the generating circuit of the coverter.

20. An electric converting system comprising in combination an electric rotary converter, an electric motor power unit and control means, said converter comprising an armature, a field structure having $2n$ poles of which $n$ poles belong to the motoring circuit of the armature and $n$ poles to the generating circuit of the armature, the $n$ primary motoring poles being set alternately with the generating poles, the armature having a winding whose span is that usually used with a $2n$ polar field, that is, of 180 electrical degrees if referred to the $2n$ polar field, but of 90 electrical degrees if referred to the $n$ pole field proper to each circuit, the main excitation on the motoring poles being provided by the armature reaction m. m. f due to the current in the generating circuit and the main excitation of the generating poles being provided by the armature reaction m. m. f. due to the current in the motoring circuit, $2n$ interpoles each interpole carrying two windings, one winding in the motoring circuit and one winding in the generating circuit, abutment windings on the generating poles comprising a winding connected across the constant voltage supply and assisting the armature m. m. f. due to the motoring current and a series opposition winding connected in series with the generated output current and opposing the armature m. m. f. due to the motoring current, a compounding magnetising winding on the motoring main poles of the converter assisting the said main excitation thereof by the armature m. m. f. due to the generated current and a series starting coil on the said motoring poles; said motor unit comprising a main motor having its armature connected to the generating circuit of the converter and its field winding supplied from a constant voltage supply, a regulating motor including a field winding and an armature, and means for driving the regulating motor at a speed proportional to that of the main motor, the armature of said regulating motor being connected in series with the field winding of said main motor and opposing the same; and said control means comprising a main regulator including resistance and contact means located in and operable to control the supply to the compounding windings on the motoring poles and to the shunt abutment field, a starting contactor including a coil operable by said contact means and which is adapted to short circuit or cut out the said starting coil, further contact means operable by the regulator to short circuit the shunt abutment coil of the converter at the neutral position of the regulator and to remove the short circuit and to provide a supply of current to the main regulator resistance when the regulator is off the neutral position, and a coil on the said further contact means connected across the regulating motor brushes, the function of this coil being to prevent the said contact means from operating until the speed has dropped to a low value if the handle of the controller is suddenly returned to neutral, while the main motor is running, thereby causing the system to regenerate and saving wear and tear in the brake.

21. A system as claimed in claim 20, in which said compounding magnetising winding is connected in series with the generating circuit of the converter and a shunt coil is provided on the motoring poles of the converter to maintain the conventer speed until the current in the generating circuit has been established and in which additional contacts are provided on said further contact means to short circuit said shunt coil at the same time the shunt abutment coils are open circuited.

22. An electric converting system consisting of an electric rotary converter for converting a constant voltage-variable direct current supply to a variable voltage-variable direct current supply or vice versa comprising a converter which comprises an armature, a field structure including alternately arranged motoring and generating poles, a winding in the armature of 180 electrical degrees span with reference to both sets of poles, the main excitation of the motoring poles being caused by the armature reaction m. m. f. of the generating circuit of the armature and the main excitation of the generating poles being caused by the armature reaction m. m. f. due to the motoring circuit of the armature, an interpole between each generating and motoring pole, each interpole carrying a winding in the motoring circuit and a winding in the generating circuit, abutment windings on the generating poles consisting of a shunt winding connected across the constant voltage supply and assisting the armature m. m. f. due to the motoring current and a series opposition coil in series with the generating circuit, a shunt compounding magnetising winding on the motoring poles assisting the said main excitation thereof, and a series starting coil on the motoring poles, and consisting of a motor unit comprising a main motor with its armature connected in said generating circuit and its field connected through a regulating resistance to said constant voltage supply, a regulating motor driven by the main motor and having its armature connected to the main motor field so as to oppose same and connected to the supply through resistance means, a field winding on said regulating motor also connected to said supply through said resistance means and a brake coil in series with said field winding, and consisting of control means comprising a regulator including said resistance means, cam means, contact means operable by said cam means to control the supply to the compounding windings and the shunt abutment windings, a starting contractor adapted to short circuit the series starting coil and which includes a coil controlled by said contact means, further contact means operable by said cam means to short circuit the shunt abutment winding at the neutral position of the regulator and to remove said short circuit and supply current from the supply to said resistance when the regulator is off the neutral position, and a coil on said further contact means connected across the brushes of the regulating motor to prevent said further contact means from operating upon sudden return of the regulator to zero until the speed has fallen to a low value.

23. An electric converting system consisting of an electric rotary converter for converting a constant voltage-variable direct current supply to a variable voltage-variable direct current supply or vice versa comprising a converter which comprises an armature, a field structure including alternately arranged motoring and generating poles, a winding in the armature of 180 electrical degrees span with reference to both sets of poles, the main excitation of the motoring poles being caused by the armature reaction m. m. f. due to the current in the generating circuit of the armature and the main excitation of the generating poles being caused by the armature reaction m. m. f. of the motoring circuit of the armature, an interpole between each generating and motoring pole, each interpole carrying a winding in the motoring circuit and a winding in the generating circuit, abutment windings on the generating poles consisting of a shunt winding connected across the constant voltage supply and assisting the armature m. m. f. due to the motoring current and a series opposition coil in series with the generating circuit, a shunt compounding magnetising winding on the motoring poles assisting the said main excitation thereof, and a series starting coil on the motoring poles, and consisting of a motor unit comprising a main motor with its armature connected in said generating circuit and its field connected through a regulating resistance to said supply, a regulating motor driven by the main motor and having its armature connected to the main motor field so as to oppose same and connected to the constant voltage supply through resistance means, a field winding on said regulating motor in series with said generating circuit of the converter and a brake coil in series with said field winding, and consisting of control means comprising a regulator including said resistance means, cam means, contact means operable by said cam means to control the supply to the compounding windings and the shunt abutment windings, a starting contactor adapted to short circuit the series starting coil and which includes a coil controlled by said contact means, further contact means operable by said cam means to short circuit the shunt abutment winding at the neutral position of the regulator and to remove said short circuit and supply current from the supply to said resistance when the regulator is off the neutral position, and a coil on said further contact means connected across the brushes of the regulating motor to prevent said further contact means from operating upon sudden return of the regulator to zero until the speed has fallen to a low value.

24. An electric converting system consisting of an electric rotary converter for converting a constant voltage-variable direct current supply to a variable voltage-variable direct current supply or vice versa comprising a converter which comprises an armature, a field structure including alternately arranged motoring and generating poles, a winding in the armature of 180 electrical degrees span with reference to both sets of poles, the main excitation of the motoring poles being caused by the armature reaction m. m. f. due to the current in the generating circuit of the armature and the main excitation of the generating poles being caused by the armatures reaction m. m. f. of the motoring circuit of the armature, an interpole between each generating and motoring pole, each interpole carrying a winding in the motoring circuit and a winding in the generating circuit, abutment windings on the generating poles consisting of a shunt winding connected across the constant voltage supply and assisting the armature m. m. f. due to the motoring current and a series opposition coil in series with the generating circuit, a compounding magnetising winding on the motoring poles in series with the generating circuit, a shunt coil on the motoring poles and a series starting coil on the motoring poles, and consisting of a motor unit comprising a main motor with its armature connected in said generating circuit and its field connected through a regulating resistance to said constant voltage supply, a regulating motor driven by the main motor and having its armature connected to the main motor field so as to oppose same and connected to the constant voltage supply through resistance means, a field winding on said regulating motor also connected to said constant voltage supply through said resistance and a brake coil in series with said generating circuit and consisting of control means comprising a regulator including said resistance means, cam means, contact means operable by said cam means to control the supply to the compounding windings and the shunt abutment windings, a starting contactor adapted to short circuit the series starting coil and which includes a coil controlled by said contact means, further contact means operable by said cam means to short circuit the shunt abutment winding at the neutral position of the regulator and to remove said short circuit and supply current from the supply to said resistance when the regulator is off the neutral position, and additional contacts on said further contact means to short circuit the shunt coils on the motoring poles at the same time that the shunt abutment coils are open circuited and a coil on said further contact means connected across the brushes of the regulating motor to prevent said further contact means from operating upon sudden return of the regulator to zero until the speed has fallen to a low value.

JAMES COLQUHOUN MACFARLANE.
WILLIAM ALLAN MACFARLANE.